United States Patent [19]

Gunn et al.

[11] Patent Number: 5,876,491

[45] Date of Patent: Mar. 2, 1999

[54] INK JET PRINTING INK

[75] Inventors: Janet Gunn; Mark Holbrook, both of Bury; Aidan Joseph Lavery, Stockport, all of United Kingdom

[73] Assignee: Zeneca Limited, London, England

[21] Appl. No.: 945,577

[22] PCT Filed: Apr. 26, 1996

[86] PCT No.: PCT/GB96/00995

§ 371 Date: Oct. 29, 1997

§ 102(e) Date: Oct. 29, 1997

[87] PCT Pub. No.: WO96/34919

PCT Pub. Date: Nov. 7, 1996

[30] Foreign Application Priority Data

Apr. 29, 1995 [GB] United Kingdom .................. 9508791

[51] Int. Cl.⁶ .................................................. C09D 11/02
[52] U.S. Cl. .................................. 106/31.46; 106/31.47; 106/31.49; 106/31.48
[58] Field of Search .............................. 106/31.46, 31.47, 106/31.49, 31.58

[56] References Cited

U.S. PATENT DOCUMENTS

| | | | |
|---|---|---|---|
| 4,196,006 | 4/1980 | Mansukhani | 106/31.58 |
| 4,325,735 | 4/1982 | Ohta et al. | 106/31.49 |
| 4,352,691 | 10/1982 | Owatari et al. | 106/31.58 |
| 4,365,998 | 12/1982 | Sugiyama et al. | 106/31.49 |
| 4,585,484 | 4/1986 | Haruta et al. | 106/31.58 |
| 4,627,875 | 12/1986 | Kobayashi et al. | 106/31.58 |
| 5,006,172 | 4/1991 | Chieng et al. | 106/31.58 |
| 5,108,503 | 4/1992 | Hindagolla et al. | 106/31.47 |
| 5,169,438 | 12/1992 | Matrick | 106/31.58 |
| 5,173,112 | 12/1992 | Matrick et al. | 106/31.47 |
| 5,205,861 | 4/1993 | Matrick | 106/31.47 |
| 5,223,026 | 6/1993 | Schwarz, Jr. | 106/31.47 |
| 5,300,143 | 4/1994 | Schwarz, Jr. | 106/31.47 |

FOREIGN PATENT DOCUMENTS

| | | |
|---|---|---|
| 027 709 | 4/1981 | European Pat. Off. . |
| 526 198 | 2/1993 | European Pat. Off. . |

OTHER PUBLICATIONS

Database WPI, Week 8551, Derwent Publication Ltd., AN85–321684 XP002006787 & JP,A,60 226 57 Nov. 11, 1985, see abstract.

Database WPI, Week 9201, Derwent Publications Ltd., AN 92–004564 XP002006788 & JP,A,03 258 869 Nov. 19, 1991, see abstract.

*Primary Examiner*—Helene Klemanski
*Attorney, Agent, or Firm*—Pillsbury Madison & Sutro LLP

[57] ABSTRACT

Ink compositions comprising an aqueous medium containing:

(1) at least one water-soluble dye;
(2) at least one cyclic ester or amide of the formula:

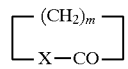

Formula (1)

wherein m is a whole number from 3 to 5 and X represents —O— or —N(R)— in which R represents hydrogen, alkyl or substituted alkyl;

(3) at least one hydroxy compound selected from polyhydroxy compounds having at least four hydroxy groups, optionally substituted cycloalkanols, cyclohexane dimethanol, benzyl alcohol, benzene dimethanol, phenol and polyhydroxybenzenes, and (4) at least one water-soluble organic solvent selected from alkanediols, alkanetriols, ether glycols and thioether glycols and suitable for use in inkjet printing processes for coloration of substrates such as paper or overhead projector slides.

11 Claims, No Drawings

INK JET PRINTING INK

This application is the national phase of international application PCT/GB96/00995, filed Apr. 26, 1996.

This invention relates to compositions of matter and more particularly to ink compositions suitable for use in ink-jet printing processes and to the use of said inks in said processes.

Ink-jet printing processes are well known and have been described, for example, by Peter Gregory in Chapter 9 of "High-Technology Applications of Organic Colorants" (Plenum Press).

In general, ink-jet printing involves squirting droplets of ink on to a substrate (paper or plastic) to produce an image. The inks used may be aqueous or non-aqueous but one commonly used type of ink comprises an aqueous medium containing a water-soluble dye and a water-soluble organic solvent such as diethylene glycol or N-methylpyrrolidone. The organic solvents serve several functions. In particular, they act as humectants and, by minimising the evaporation of water, they prevent crystallisation or crusting of the dye which could block the ink-jet nozzles. The organic solvents also help to control the viscosity and surface tension of the inks and they can improve the solubility of the dye thus providing more stable inks.

The inks hitherto proposed have not been entirely satisfactory in all respects, however, and it has now been found that by incorporating certain mixtures of water-soluble organic dyes, inks having improved properties can be obtained. In particular, it has been found that prints having improved dry time and wet fastness and also increased optical density can be obtained by using the inks hereinafter defined. Furthermore, the prints obtained by using black dyes display little or no bronzing.

Thus, according to the present invention, there is provided an ink composition comprising an aqueous medium containing:

(1) at least one water-soluble dye;

(2) at least one cyclic ester or amide of the Formula (1):

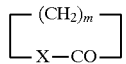  Formula (1)

wherein m is a whole number from 3 to 5 and X represents —O— or —N(R)— in which R represents hydrogen, alkyl or substituted alkyl;

(3) at least one hydroxy compound selected from polyhydroxy compounds having at least four hydroxy groups, optionally substituted cycloalkanols, cyclohexane dimethanol, benzyl alcohol, benzene dimethanol, phenol and polyhydroxybenzenes, and (4) at least one water-soluble organic solvent selected from alkanediols, alkanetriols, ether glycols and thioether glycols.

As examples of alkyl and substituted alkyl groups which may be presented by R in the cyclic amides of Formula (1), there may be mentioned $C_{1-6}$-alkyl groups and substituted $C_{1-6}$-alkyl groups, for example hydroxy-substituted $C_{1-6}$-alkyl groups.

As specific examples of cyclic esters or amides which may be present in the ink compositions of the invention, there may be mentioned ε-caprolactone, γ-butyrolactone, ε-caprolactam, δ-valerolactam, N-methylcaprolactam, 2-pyrrolidone and N-(2-hydroxyethyl)-2-pyrrolidone.

Polyhydroxy compounds having at least four hydroxy groups which may be present in the compositions include glucose and polyhydroxyalkanes such as pentaerythritol, sorbitol and meso-inositol.

Optionally substituted cycloalkanols which may be incorporated in the inks of the invention suitably contain from 4 to 8 ring carbon atoms which may optionally carry substituents of types which do not reduce water-solubility below an acceptable level. Preferred cycloalkanols include cyclopentanol and optionally substituted cyclohexanols of the Formula (2):

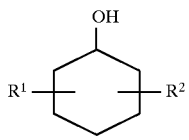  Formula (2)

wherein each of $R^1$ and $R^2$, independently, is selected from hydrogen, lower alkyl particularly $C_{1-4}$-alkyl; lower alkoxy particularly $C_{1-4}$-alkoxy, hydroxy, amino, nitro, carboxy and sulpho. The most preferred cycloalkanol is cyclohexanol.

Alkanediols which may be used include those already proposed for inclusion in aqueous inks, for example propylene glycol and diols of the Formula (3):

  Formula (3)

wherein n is a whole number from 2 to 6, for example ethylene glycol and pentane-1,5-diol.

Alkanetriols which may be incorporated in the inks include glycerol and 1,2,6-hexanetriol.

Examples of ether glycols which may be incorporated include diethylene glycol, triethylene glycol, tetraethylene glycol, dipropylene glycol and trpropylene glycol. Suitable thioether glycols include thiodiglycol.

The ink compositions of the invention typically contain from 0.01 to 20%, preferably from 1 to 10% and more preferably from 2 to 5% by weight of the cyclic ester or amide identified as ingredient (2) above, for example caprolactone or caprolactam, based on the total weight of the ink composition. The hydroxy compound identified as ingredient (3) above, for example cyclohexanol, is typically present in an amount of from 0.1 to 5% preferably 0.1 to 3%, more preferably from 0.5 to 3% and especially from 0.5 to 2% by weight and the water-soluble organic solvent identified as ingredient (4) above, for example 1,5-pentanediol, is typically present in an amount of from 1 to 20%, preferably from 2 to 10% by weight based on the total weight of the ink composition.

Water-soluble dyes which may be present in the inks of the invention particularly include anionic dyes which owe their water-solubility to the presence of a number of sulphonate and/or carboxylate and/or thiocarboxylate groups. In many dye structures, it is preferred that the number of carboxylate and/or thiocarboxylate groups is at least equal to the number of sulphonate groups. The majority of suitable dyes belong to the azo, especially disazo, or phthalocyanine series.

As examples of especially suitable dyes for use in the inks of the invention, there may be mentioned dyes of the following classes:

(1) Azo compounds of Formula (4) and salts thereof:

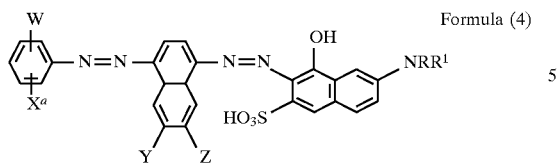

Formula (4)

wherein
W is COOH
$X^a$ is H, COOH, $SO_3H$, halo, hydroxy, nitro, cyano, $C_{1-6}$-alkyl, $C_{1-6}$-alkoxy or $C_{1-6}$-acylamino;
Y is H, COOH or $SO_3H$;
Z is H, COOH or $SO_3H$;
$R^a$ & $R^1$ each independently is H or $C_{1-6}$-alkyl substituted by 0,1 or 2 —$COOR^2$ groups;
$R^{2x}$ is H or $C_{1-6}$-alkyl; provided that there are at least two COOH groups and that the number of COOH groups is equal to or greater than the number of $SO_3H$ groups.

The dyes of Formula (4) are described in greater detail in our EP-A-0356080.

(2) Azo compounds of Formula (5) and salts thereof:

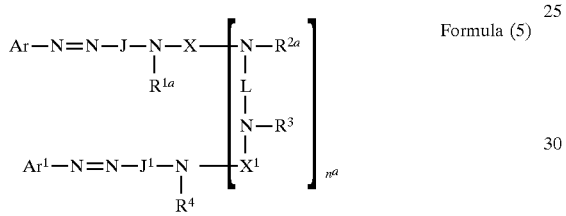

Formula (5)

wherein
Ar and $Ar^1$ each independently is aryl or substituted aryl providing at least one of Ar and $Ar^1$ has at least one substituent selected from COOH and COSH;
J and $J^1$ each independently is of Formula (5a), (5b) or (5c):

Formula (5a)

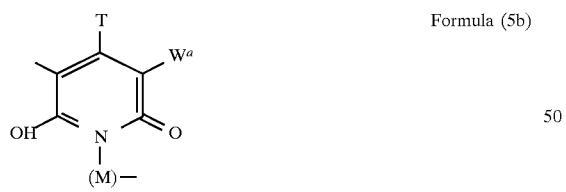

Formula (5b)

Formula (5c)

each $R^5$ is independently selected from H, alkyl, substituted alkyl, alkoxy, halogen, CN, ureido and $NHCOR^6$;
$R^6$ is H, alkyl, substituted alkyl, aryl, substituted aryl, aralkyl or substituted aralkyl;
each T is independently alkyl;
each $W^a$ is independently selected from H, CN, $CONR^{10}R^{11}$, pyridinium and COOH;
each M is an alkylene chain having 2 to 8 carbon atoms;
B is H, alkyl or COOH;
$R^{1a}, R^{2a}, R^3, R^4, R^{10}$ and $R^{11}$ are each independently H, alkyl or substituted alkyl;
L is a divalent organic linking group;
$n^a$ is 0 or 1;
each $X^1$ is independently carbonyl or a group of the Formula (5d), (5e) or (5f):

Formula (5d)

Formula (5e)

Formula (5f)

$Z^a$ is $OR^7$, $SR^7$ or $NR^8R^9$;
$Y^a$ is H, Cl, CN or $Z^a$;
E is Cl or CN;
$R^7$, $R^8$ and $R^9$ are independently H, alkenyl, substituted alkenyl, alkyl, substituted alkyl, aryl, substituted aryl, aralkyl or substituted aralkyl, or $R^8$ and $R^9$ together with the nitrogen atom to which they are attached form a 5 or 6 membered ring;
provided (i) if the compound of Formula (5) has no —$SO_3H$ groups then it has at least two groups selected from —COOH and —COSH; and (ii) the compound of Formula (5) has at least as many groups selected from —COOH and —COSH as —$SO_3H$ groups.

The dyes of Formula (5) are described in greater detail in our EP-A-0468647.

(3) Azo compounds of Formula (6) and salts thereof:

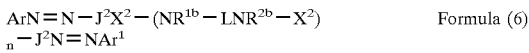

Formula (6)

wherein:

$J^2$ is 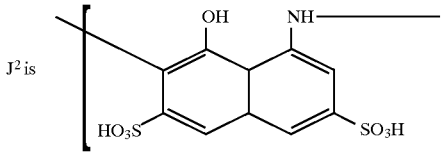

Ar and $Ar^1$ as hereinbefore defined;
each $R^{1b}$ and $R^{2b}$ is independently H, alkyl, substituted alkyl, alkenyl or substituted alkenyl;
L is a divalent organic linking group;
n is as hereinbefore defined;
each $X^2$ independently is carbonyl or a group of the Formula (6a), (6b) or (6c):

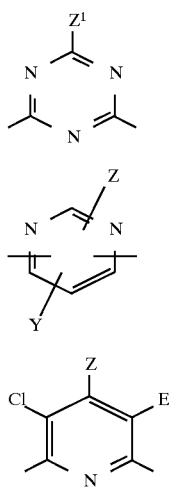

Formula (6a)

Formula (6b)

Formula (6c)

each $Z^1$ independently is $NR^{3a}R^{4a}$, $SR^{5a}$ or $OR^{5a}$;

each Y independently is H, Cl, $Z^1$, $SR^{6a}$ or $OR^{6a}$;

each E independently is Cl or CN;

$R^{3a}, R^{4a}, R^{5a}$ and $R^{6a}$ are each independently H, alkyl, substituted alkyl, alkenyl, substituted alkenyl, aryl, substituted aryl, aralkyl, substituted aralkyl or $R^{3a}$ and $R^{4a}$ together with the nitrogen atom to which they are attached form a 5 or 6 membered ring;

provided the compound of Formula (6) has at least as many groups selected from —COOH and —COSH as —SO$_3$H groups.

The dyes of Formula (6) are described in greater detail in our EP-A-0468648.

(4) Azo compounds of Formula (7) and salts thereof:

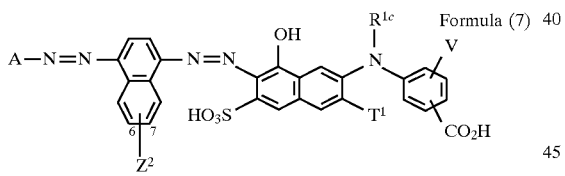

Formula (7)

wherein

A is an optionally substituted phenyl or naphthyl group;

$Z^2$ is H, CO$_2$H, SO$_3$H or SO$_2$NH$_2$;

$T^1$ is H or SO$_3$H;

$R^{1c}$ is H or optionally substituted alkyl;

V is H, CO$_2$H, SO$_3$H, CH$_3$ or Cl;

provided that the compound of Formula (7) has at least as many CO$_2$H groups as SO$_3$H groups.

The dyes of Formula (7) are described in greater detail in our EP-A-0572419.

(5) Azo compounds of Formula (8) and salts thereof:

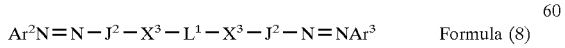

Formula (8)

wherein:

$J^2$ is as hereinbefore defined;

Ar$^2$ and Ar$^3$ are each independently aryl containing at least two carboxy groups; and $L^1$ is a group of the Formula (8b) or (8c):

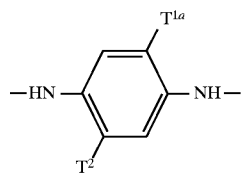

Formula (8b)

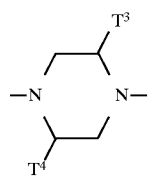

Formula (8c)

in which $T^{1a}$ and $T^2$ each independently is C$_{1-4}$-alkyl, C$_{1-4}$-alkoxy or C$_{3-4}$-alkenyl; and $T^3$ and $T^4$ each independently is H, C$_{1-4}$-alkyl, C$_{1-4}$-alkoxy or C$_{3-4}$-alkenyl provided that $T^3$ and $T^4$ are not both H;

each $X^3$ independently is a group of the Formula (8d), (8e) or (8f):

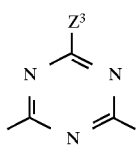

Formula (8d)

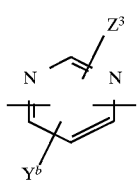

Formula (8e)

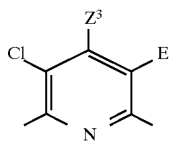

Formula (8f)

each $Z^3$ independently is H, halogen, alkyl, $NR^{3a}R^{4a}$, $SR^{5a}$ or $OR^{5a}$;

each $Y^b$ independently is Z, $SR^{6a}$ or $OR^{6a}$;

each E independently is as hereinbefore defined; and $R^{3a}, R^{4a}, R^{5a}$ and $R^{6a}$ each independently is as hereinbefore defined.

(6) Azo compounds of Formula (9) and salts thereof:

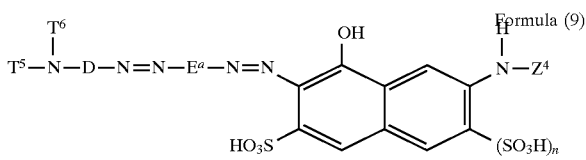

Formula (9)

wherein $T^5$ and $T^6$ each independently is H, acyl or optionally substituted alkyl or aryl; or $T^5$ and $T^6$ together represent optionally substituted hydrocarbylene optionally interrupted by oxygen;

D is optionally substituted phenylene or naphthylene;

$E^a$ is optionally substituted naphthylene or quinolinylene;

$Z^4$ is H or optionally substituted aryl; and
n is as hereinbefore defined;
provided that $T^5$, $T^6$ and Z are not all H when n has a value of 0.

(7) Azo compounds of Formula (10) and salts thereof:

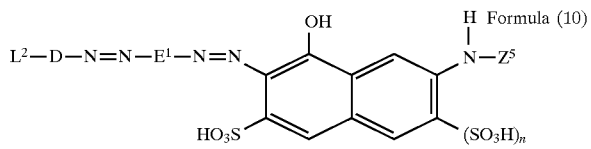

wherein:
$L^2$ is optionally substituted piperazinyl;
D is as hereinbefore defined;
$E^1$ is optionally substituted phenylene, naphthylene or quinolinylene;
$Z^5$ is optionally substituted carboxyaryl; and
n is as hereinbefore defined.

(8) Azo compounds of Formula (11) and salts thereof:

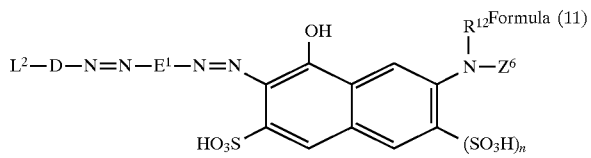

wherein:
$L^2$ is as hereinbefore defined;
D is as hereinbefore defined;
$E^1$ is as hereinbefore defined;
$R^{12}$ is H or $C_{1-4}$-alkyl;
n is as hereinbefore defined; or
$Z^6$ is H, alkyl or aryl free from water-solubilising groups. (9) Azo compounds of Formula (12) and salts thereof:

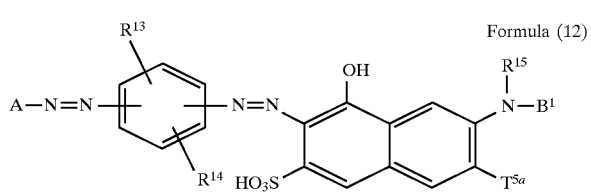

wherein:
A is as hereinbefore defined;
$T^{5a}$ is H or sulpho;
$R^{13}$ is optionally substituted alkoxy, optionally substituted alkyl, acylamino or $NR^{16}R^{17}$;
$R^{14}$ is optionally substituted alkoxy, optionally substituted alkylthio, optionally substituted alkyl, acylthio, Cl, H, $CO_2H$, $SO_3H$ or $NR^{16}R^{17}$;
$R^{15}$, $R^{16}$ and $R^{17}$ are each independently H or optionally substituted alkyl; and
$B^1$ is H, a phenyl group having one or two carboxy substituents, optionally substituted alkyl or optionally substituted aryl.

(10) Phthalocyanine compounds of Formula (13) and salts thereof:

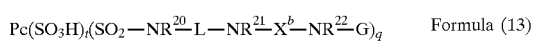

wherein:
Pc is a metal-containing phthalocyanine nucleus;
$R^{20}$, $R^{21}$ and $R^{22}$ are each independently H, alkyl, substituted alkyl, alkenyl, substituted alkenyl, aralkyl or substituted aralkyl;

L is a divalent organic linking group;
each $X^b$ independently is carbonyl or a group of Formula (5d), (5e) or (5f)
G is a colourless organic radical substituted by one or two groups selected from COSH or COOH; and
(t+q) is from 3 to 4 inclusive.

The dyes of Formula (13) are described in greater detail in our EP-A-0468649.

(11) Phthalocyanine compounds of Formula (13A) and salts thereof:

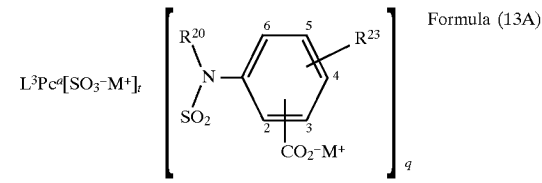

wherein:
$L^3$ is a metal cation or hydrogen;
$Pc^a$ is a phthalocyanine radical having a valency from 3 to 4;
$R^{20}$ is as hereinbefore defined;
$R^{23}$ is H, alkyl, alkoxy, halo or an optionally substituted amino group;
$M^+$ is $NH_4^+$ or a substituted ammonium cation; and
(t+q) is from 3 to 4 inclusive;
with the proviso that the group $CO_2^-M^+$ is at the 2-, 3-, 5- or 6-position in Formula (13A).

The dyes of Formula (13A) are described in greater detail in our EP-A-0559309.

The inks of the invention suitably contain from 0.2 to 20%, preferably from 0.5 to 10% and more preferably from 1 to 5% by weight of water-soluble dye based on the total weight of ink. It is preferred that the dye is completely dissolved in the aqueous medium to form a solution.

The ink compositions of the invention may also advantageously contain urea. It is preferred that the inks of the present invention further comprise one or more of a penetrant to assist permeation of the dye into a paper substrate, a kogation-reducing agent to prevent or reduce the build-up of residue (koga) on the resistor surface in thermal ink jet printers and a buffer such as sodium borate, to stabilise the pH of the ink.

The kogation-reducing agent is preferably an oxo anion, such as described in EP 425150A. The oxo-anion may be $C_2O_4^{2-}$, $SO_3^{2-}$, $SO_4^{2-}$, molybdate, $AsO_4^{3-}$ or more preferably a phosphate ester, a diorganophosphate or more especially a phosphate salt which is particularly effective in reducing kogation.

As examples of phosphate salts, there may be mention dibasic phosphate ($HPO_4^{2-}$) monobasic phosphates ($H_2PO_4^-$) and polyphosphates ($P_2O_7^{4-}$). The selection of counter ion is not believed to be critical and examples include alkali metals, ammonium and alkylammonium cations.

The kogation-reducing agent is preferably present in the ink at a concentration from 0.001 % to 15%, based on oxo-anion, and more preferably from 0.01% to 1% (by weight).

A further aspect of the present invention provides a process for printing a substrate with an ink composition as hereinbefore defined.

A suitable process for the application of an ink as hereinbefore defined comprises forming the ink into small droplets by ejection from a reservoir through a small orifice so that the droplets of ink are directed at a substrate. This process is commonly referred to as ink jet printing, and the ink jet printing processes for the present inks are preferably piezoelectric ink jet printing, and more especially thermal ink jet printing. In thermal ink jet printing, programmed pulses of heat are applied to the ink by means of a resistor, adjacent to the orifice during relative movement between the substrate and the reservoir.

A preferred substrate is an overhead projector slide or a cellulosic substrate, especially plain paper, which may have an acid, alkaline or neutral character.

According to a still further aspect of the present invention, there is provided a paper or an overhead projector slide printed with an ink composition according to the invention.

The colorants and inks described herein may be used in admixture with other colorants and inks or separately with other colorants and inks in an ink jet printer to give a printer capable of printing a variety of colours and shades. Suitable other colorants and inks have been fully described in the prior art.

The invention is further illustrated by the following Examples in which all parts and percentages are by weight unless otherwise indicated.

EXAMPLES 1–5

The ink formulations tabulated below were prepared in glass bottles and the pH value of each adjusted to 9.5±0.1 by the addition of concentrated ammonia. The bottles were then held in an ultrasonic bath for 2–3 hours, checking for dissolution under the microscope. The inks were screened through a membrane filter with a pore size of 0.45 micron under vacuum prior to introduction into the pen cartridges which were primed using vacuum before printing on copying and bond paper using an HP 500C ink-jet printer.

The ink formulations comprised 2% solutions of a black dye of the Formula (14):

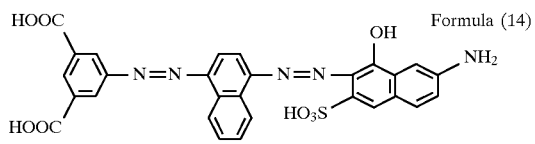

Formula (14)

in the following ink vehicles:

| 1. | Diethylene glycol | 5 parts |
|---|---|---|
|  | Caprolactone | 2 parts |
|  | Cyclohexanol | 1 parts |
|  | Water | 92 parts |
| 2. | Pentane-1,5-diol | 5 parts |
|  | Caprolactone | 2 parts |
|  | Cyclohexanol | 1 parts |
|  | Water | 92 parts |
| 3. | Pentane-1,5-diol | 5 parts |
|  | Urea | 4 parts |
|  | Caprolactone | 5 parts |
|  | Cyclohexanol | 1 parts |
|  | Water | 85 parts |
| 4. | Diethylene glycol | 5 parts |
|  | Caprolactone | 3 parts |
|  | Cyclohexanol | 2 parts |
|  | Water | 90 parts |
| 5. | Diethylene glycol | 5 parts |
|  | 2-pyrrolidone | 5 parts |
|  | Cyclohexanol | 2 parts |
|  | Water | 88 parts |

The prints obtained were evaluated for optical density, wet fastness, rundown (dry time) and bronzing.

In the wet fastness test, a test print comprises four squares. The reflected optical density (ROD) of each of the four squares is measured using a previously calibrated Sakura densitometer and the correct filter for the colour under test. The average ROD for the four squares is calculated. The print is then immersed in de-ionised water (pH 5.5±1.0, temp. 22±2° C.) and stirred slowly for 5 minutes using a magnetic stirrer. The print is removed from the water, placed on absorbent paper and allowed to dry (room temperature, approx 2 h). When dry, the ROD for each of the four squares is again measured and the average value calculated.

The water fastness (wf) is expressed as follows:

$$\% \text{ water fastness} = \frac{\text{Average ROD after immersion}}{\text{Average ROD before immersion}} \times 100$$

In the rundown test, a test print of parallel lines is attached to a support at an angle of 45° so that the parallel lines are horizontal. A micropipette is used to dispense 250 Tl of distilled water (pH 5.5±1.0, temp. 22±2° C.) slowly on to the print at a position slightly above the top of the parallel lines. Care is taken to ensure that the run down is as nearly vertical as possible. The test may be performed at time intervals considered appropriate to give the most meaningful information with regard to the dry time of the ink (The standard test is for the time intervals, 5 15, 30, 60 minutes and 24 hours). The rundown is assessed visually by comparison with a grey scale of 1–10 where level 10 shows no wash-off and level 1 severe wash-off.

Bronzing is assessed visually.

The ink formulations of Examples 1–5 gave the following results.

TABLE 1

|  | OD | % WF | Rundown | Bronzing |
|---|---|---|---|---|
| Xerox Acid 4024 paper* | | | | |
| Example 1 | 1.33 | 99.2 | 8/9 @ 60 | None |
| Example 2 | 1.24 | 100 | 8/9 @ 30 | Slight |
| Example 3 | 1.20 | 98.33 | 9/10 @ 5 | Moderate |
| Example 4 | 1.18 | 100 | 8/9 @ 5 | Moderate |
| Example 5 | 1.41 | 99.3 | 7 @ 60 | None |
| Gilbert Bond Paper** | | | | |
| Example 1 | 1.36 | 100 | 8 @ 60 | None |
| Example 2 | 1.25 | 100 | 8/9 @ 15 | None |
| Example 3 | 1.31 | 99.24 | 9/10 @ 5 | v. v. slight |
| Example 4 | 1.25 | 100 | 8/9 @ 30 | None |
| Example 5 | 1.38 | 97.1 | 7 @ 60 | None |

*obtainable form Xerox Corporation, 800 Phillips Road, Webster, New York 14580, USA
**obtainable from Hewlett Packard, San Diego, California, USA

COMPARATIVE EXAMPLE 1–4

Ink formulations were prepared exactly as for Examples 1–5 but using the following ink vehicles:

| 1. | 2-pyrrolidone | 10 parts |
|---|---|---|
|  | Water | 90 parts |
| 2. | Diethylene glycol | 8 parts |
|  | Water | 92 parts |
| 3. | Diethylene glycol | 6 parts |
|  | Cyclohexanol | 2 parts |
|  | Water | 92 parts |
| 4. | Diethylene glycol | 4 parts |
|  | Caprolactam | 4 parts |
|  | Water | 92 parts |

The points obtained were evaluated as for Examples 1–5 with the following results:

TABLE 2

|  | OD | % WF | Rundown | Bronzing |
|---|---|---|---|---|
| Xerox Acid 4024 Paper | | | | |
| Comparative Example 1 | 1.10 | 88.2 | 8/9 @ 60 | Heavy |
| Comparative Example 2 | 1.02 | 93.1 | 8/9 @ 60 | Heavy |
| Comparative Example 3 | 0.71 | 97.2 | 9 @ 5 | None |
| Comparative Example 4 | 1.02 | 95.1 | 8/9 @ 60 | Heavy |
| Gilbert Bond paper | | | | |
| Comparative Example 1 | 1.11 | 98.2 | 8/9 @ 30 | Heavy |
| Comparative Example 2 | 1.01 | 100 | 8/9 @ 30 | Heavy |
| Comparative Example 3 | 0.76 | 100 | 9 @ 5 | None |
| Comparative Example 4 | 1.08 | 98.1 | 8/9 @ 15 | Heavy |

Comparison of Tables 1 and 2 show that the prints obtained from the ink formulations of Examples 1–5 were generally superior to those relating to Comparative Examples 1–4 in respect of optical density, wet fastness and bronzing. It was also observed that the formulation of Examples 1–5 gave sharper and more even textured prints than the formulations of Comparative Examples 1–4.

EXAMPLE 6

The dye of Formula (14) (1.25 g) was dissolved in deionised water (44.75 cm$^3$) by adding 0.88M ammonia solution to pH=9.5. Diethyleneglycol (3 cm$^3$) caprolactone (0.5 cm$^3$) and cyclohexanol (0.5 cm$^3$) were added and the

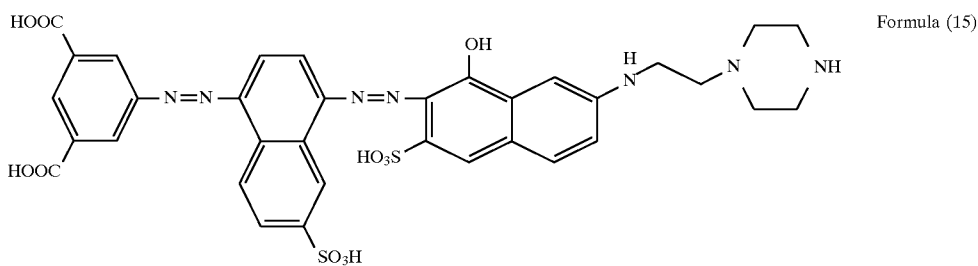

mixing completed in an ultra-sonic bath. This ink solution was filtered and put into an ink cartridge and printed using an HP 500 inkjet printer.

Print Quality:

The optical density of the print was very good ROD=1.35 (measured using an X-rite 938 densitometer), wetfastness=100% (immersion test),
wetfastness (rundown=10 after 24 hours on random scale 1–10 where 10 means no
visible rundown),
good light fastness,
no bronzing,
print quality very good,
no crusting,
immediate restart.

EXAMPLE 7

A dye of Formula (14A)

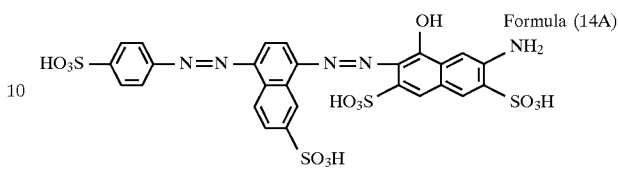

and the dye of Formula (14) (0.375 g) were dissolved in water (40 g) by adding 0.88M NH$_3$ (several drops) adjusting the pH to 9.5. Thiodiglycol (4.5 g). 2-pyrrolidone (4.5 g) and cycloglycol (1 g) were added and the ink stirred at room temperature. The ink was then filtered, put into an empty ink-jet cartridge and printed onto plain paper (typically Xerox Acid 4024, Gilbert Bond and Wiggins Conqueror available from Arjo Wiggins Appleton PLC UK).

This gave very good print optical density ROD=1.3, no bronzing, very good print quality, no crusting, immediate restart.

EXAMPLE 8

An ink was prepared by the method of Example 6 using the dye of Formula (15) in place of the dye of Formula (14)
Dye 1.25 g
Glycol 4.5 g
2-pyrrolidone 4.5 g
cyclohexanol 1.0 g
Water 38.75 g
ink pH=9.5 (adjusted using 0.88M NH$_3$)
Print Quality:
No bronzing
wetfastness=100%,
wetfastness (random=10 after 1 hr)
print quality excellent,
reduced colour to colour bleed (i.e. less invasion of black ink into adjacent colour)
light fastness=good,
good optical density.

EXAMPLE 9

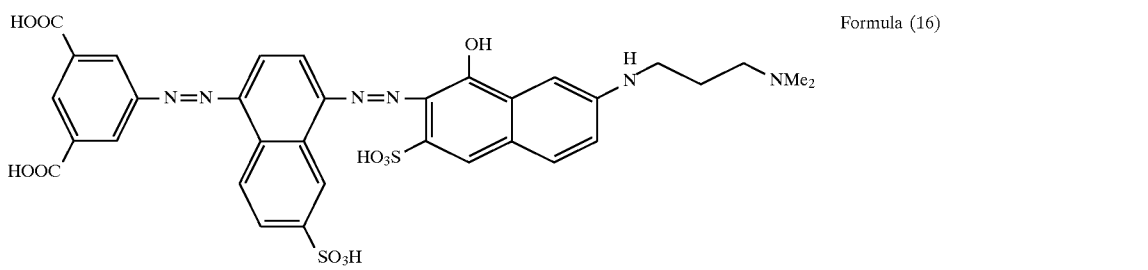

Formula (16)

An ink was prepared using the method of Example 8 using the dye of Formula (16) in place of the dye of Formula (15).
Print Quality:
No bronzing
wetfastness=100%,
wetfastness (random=10 after 1 hr)
print quality excellent,
reduced colour to colour bleed (i.e. less invasion of black ink into adjacent colour)
light fastness=good,
good optical density.

EXAMPLE 10

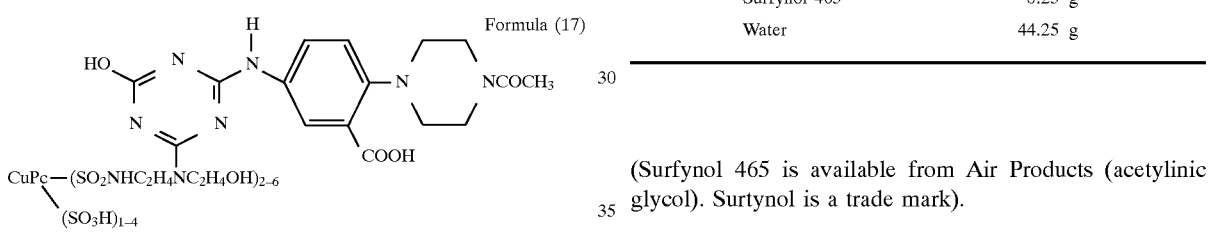

Formula (17)

An ink was prepared in a similar way to that in Example 8 using the dye of Formula (17) in place of the dye of Formula (15) and the following

EXAMPLE 11

The dye of Formula (17) was used in the following ink

| Dye | 1.75 g |
|---|---|
| pentane-1,5-diol | 2.25 g |
| caprolactone | 1.0 g |
| cyclohexanol | 0.5 g |
| Surfynol 465 | 0.25 g |
| Water | 44.25 g |

(Surfynol 465 is available from Air Products (acetylinic glycol). Surtynol is a trade mark).

EXAMPLE 12

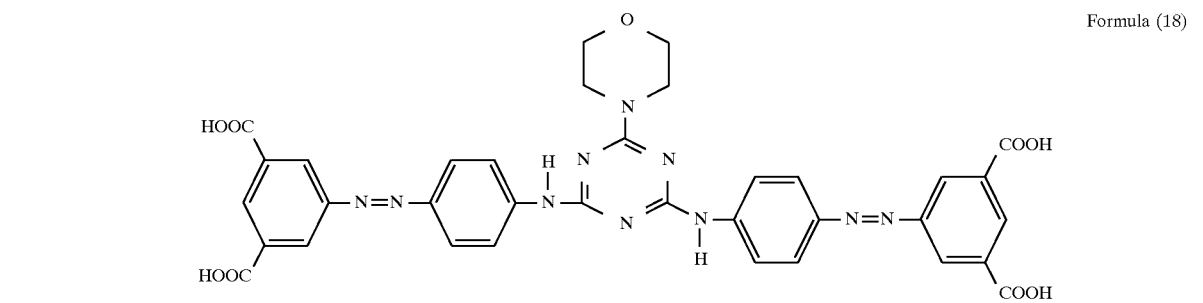

Formula (18)

The dye of Formula (18) was used in the following ink

| Dye | 1.75 g |
|---|---|
| pentane-1,5-diol | 2.5 g |
| caprolactone | 1.0 g |
| cyclohexanol | 0.5 g |
| water | 44.25 g |

Print Quality:
good optical density,
wetfastness=100% (immersion)
wetfastness=10% (rundown after 1 hr)
no bronzing, very good print quality, very good light fastness.

| Dye | 1 g |
|---|---|
| Pentane-1,5-diol | 2.5 g |
| caprolactone | 1.0 g |
| cyclohexanol | 0.5 g |
| Water | 45 g | pH adjusted to 9.5 with 0.88M NH$_3$.
Print Quality:
good optical density
no bronzing,
good print quality,
weffastness=100% (immersion after 24 hours)

wetfastness=10 % (rundown after 1 hour)
no crusting, immediate restart (both after 24 hours)
very good light fastness,
reduced colour to colour bleed

EXAMPLE 13

Example 12 was repeated using the dye of Formula (19) in place of the dye of Formula (18)

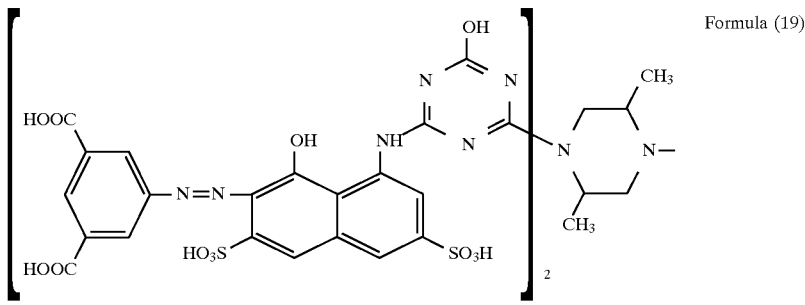

Formula (19)

Print Quality:
good optical density
no bronzing,
good print quality,
wetfastness (immersion)=90% (after 24 hours)
weffastness (rundown)=8% (after 24 hours)
light fastness good

EXAMPLE 14

Example 12 was repeated using the dye of Formula (20) in place of the dye of Formula (18)

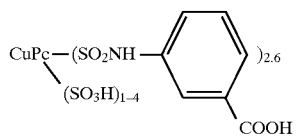

Formula (20)

Print Quality:
good optical density
no bronzing,
good print quality,
weffastness=100% (immersion after 24 hours)
weffastness=10 % (rundown after 1 hour)
no crusting, immediate restart (both after 24 hours)
very good light fastness,
reduced colour to colour bleed

EXAMPLE 15

| Dye of Formula (14) | 1.25 g |
| --- | --- |
| PEG 200 | 8 g |
| butyrolactone | 1 g |
| cyclohexanol | 1 g |
| Water | 38.75 g | pH adjusted to 9.5 with 0.88M ammonia solution.
The ink prepared in a similar manner to Example 6.
Print Quality:
The optical density of the print was very good ROD=1.35 (measured using an X-rite 938 densitometer),
wetfastness=100% (immersion test),
wetfastness (rundown=10 after 24 hours on random scale 1–10 where 10 means no visible random),
good light fastness,
no bronzing,
print quality very good,
no crusting,
immediate restart.

EXAMPLE 16

| Dye of Formula (14) | 1.25 g |
| --- | --- |
| 2-pyrrolidone | 2.5 g |
| diethyleneglycol | 2.5 g |
| caprolactone | 1.5 g |
| cyclohexanol | 1.0 g |
| Water | 41.25 g | pH adjusted to 9.5 with 0.88M ammonia solution. The ink was prepared in a similar manner to Example 6.
Print Quality:
The optical density of the print was very good ROD=1.35 (measured using an X-rite 938 densitometer),
wetfastness=100% (immersion test),
wetfastness (rundown=10 after 24 hours on random scale 1–10 where 10 means no visible random),
good light fastness,
no bronzing,
print quality very good,
no crusting,
immediate restart.

EXAMPLE 17

| Dye of Formula (14) | 0.625 g |
| --- | --- |
| Dye of Formula (15) | 0.625 g |
| 2-pyrrolidone | 2.5 g |
| diethyleneglycol | 2.5 g |
| caprolactone | 1.5 g |
| cyclohexanol | 1.0 g |
| Water | 41.25 g |

Print Quality:
The optical density of the print was very good ROD=1.35 (measured using an X-rite 938 densitometer),
wetfastness=100% (immersion test),
wetfastness (rundown=10 after 24 hours on random scale 1–10 where 10 means no visible random),
good light fastness,
no bronzing,
print quality very good,
no crusting,
immediate restart.

EXAMPLE 18

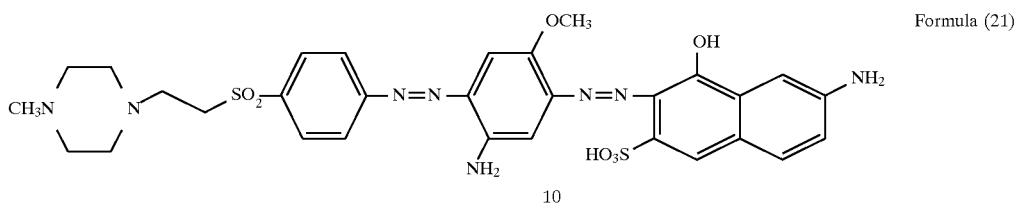

Formula (21)

| Dye of Formula (21) | 1.25 g |
| --- | --- |
| 2-pyrrolidone | 2.5 g |
| diethyleneglycol | 2.5 g |
| caprolactone | 1.5 g |
| cyclohexanol | 1.0 g |
| Water | 41.25 g |

Print Quality:
The optical density of the print was very good ROD=1.35 (measured using an X-rite 938 densitometer),
wetfastness=100% (immersion test),
wetfastness (rundown=10 after 24 hours on random scale 1–10 where 10 means no visible random),
good light fastness,
no bronzing,
print quality very good,
no crusting,
immediate restart.

EXAMPLE 19

| Dye of Formula (28) | 1.25 g |
| --- | --- |
| 2-pyrrolidone | 2.5 g |
| diethyleneglycol | 2.5 g |
| cyclohexanol | 1.0 g |
| Water | 42.75 g |

Print Quality:
The optical density of the print was very good ROD=1.35 (measured using an X-rite 938 densitometer),
wetfastness=100% (immersion test),
wetfastness (rundown=10 after 24 hours on random scale 1–10 where 10 means no visible random),
good light fastness,
no bronzing,
print quality very good,
no crusting,
immediate restart.

EXAMPLE 20

| Dye of Formula (22) | 1.25 g |
| --- | --- |
| pentane-1,5-diol | 6.0 g |
| capralactone | 1.0 g |

| cyclohexane-1,4-diol | 0.5 g |
| --- | --- |
| Water | 41.25 g | pH adjusted to 9.5 with 0.88M ammonia solution.
Print Quality
Wetfastness 100% (immersion)
Wetfastness rundown—10% (1 hour)
optical density good
no bronzing
good light fastness
excellent print quality

EXAMPLE 21

| Dye of Formula (22) | 1.25 g |
| --- | --- |
| pentane-1,5-diol | 2.5 g |
| caprolactam | 2.5 g |
| caprolactone | 2.5 g |
| cyclohexane-1,4-diol | 2.0 g |
| Water | 39.25 g | pH adjusted to 9.5 with 0.88M ammonia solution.
Print Quality
Wetfastness 100% (immersion)
Wetfastness rundown—10% (1 hour)
optical density good
no bronzing
good light fastness
excellent print quality

EXAMPLE 22

| Dye of Formula (22) | 1.25 g |
| --- | --- |
| 2-pyrrolidone | 4.5 g |
| diethyleneglycol | 4.5 g |
| cyclopentanol | 1.0 g |
| Water | 38.75 g |

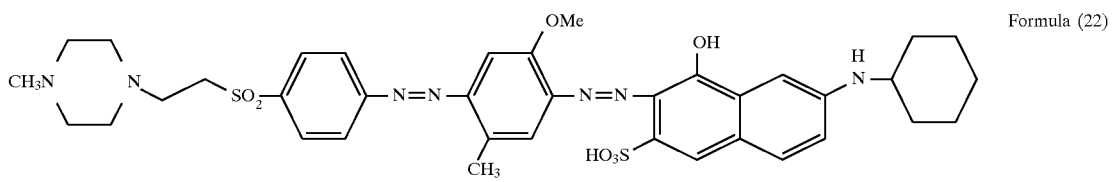

Formula (22)

pH adjusted to 9.5 with 0.88M ammonia solution.

Print Quality:
The optical density of the print was very good ROD=1.35 (measured using an X-rite 938 densitometer),
wetfastness=100% (immersion test), wetfastness (rundown=10 after 24 hours on random scale 1–10 where 10 means no visible random),
good light fastness,
no bronzing,
print quality very good,
no crusting,
immediate restart.

EXAMPLE 23

| Dye of Formula (14) | 1.25 g |
| --- | --- |
| 2-pyrrolidone | 4.5 g |
| diethyleneglycol | 4.5 g |
| benzene1,4-diemethanol | 1.0 g |
| Water | 38.75 g | pH adjusted to 9.5 with 0.88M ammonia solution.
Print Quality:
The optical density of the print was very good ROD=1.35 (measured using an X-rite 938 densitometer),
wetfastness=100% (immersion test),
weffastness (rundown=10 after 24 hours on random scale 1–10 where 10 means no visible random),
good light fastness,
no bronzing,
print quality very good,
no crusting,
immediate restart.

We claim:

1. An ink composition comprising an aqueous medium containing:
   (1) at least one water-soluble dye;
   (2) at least one cyclic ester or amide of the formula:

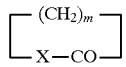

Formula (1)

wherein m is a whole number from 3 to 5 and X represents —O— or —N(R)— in which R represents hydrogen, alkyl or substituted alkyl;
   (3) at least one hydroxy compound selected from the group consisting of polyhydroxy compounds having at least four hydroxy groups, optionally substituted cycloalkanols, cyclohexane dimethanol, benzyl alcohol, benzene dimethanol, phenol and polyhydroxybenzenes, and
   (4) at least one water-soluble organic solvent selected from the group consisting of alkanediols, alkanetriols, ether glycols and thioether glycols.

2. An ink composition according to claim 1 wherein ingredient (2) comprises caprolactone or caprolactam.

3. An ink composition according to claim 1 or claim 2 wherein ingredient (3) comprises cyclohexanol.

4. An ink composition according to any one of claims 1 to 3 wherein ingredient (4) comprises diethylene glycol or pentane-1,5-diol.

5. An ink composition according to any one of claims 1 to 4 containing from 0.01 to 20% by weight of ingredient (2), from 0.1 to 5% by weight of ingredient (3) and from 1 to 20% by weight of ingredient (4) based on the total weight of the ink composition.

6. An ink composition according to any one of claims 1 to 5 wherein the water-soluble dye comprises an anionic dye containing sulphonate and/or carboxylate and/or thiocarboxylate groups.

7. An ink composition according to claim 6 wherein the number of carboxylate and/or thiocarboxylate groups in the dye is at least equal to the number of sulphonate groups.

8. An ink composition according to claim 6 or claim 7 wherein the dye is a member of the azo or phthalocyanine series.

9. An ink composition according to any one of claims 1 to 8 containing from 0.2 to 20% by weight of water-soluble dye.

10. An ink jet printing process which comprises applying an ink composition as claimed in any one of claims 1 to 9 to a substrate by a piezoelectric or thermal ink jet printing process.

11. An overhead projector slide or paper substrate printed by the ink jet printing process claimed in claim 10.

* * * * *